United States Patent [19]

Krapcho

[11] 3,852,339
[45] Dec. 3, 1974

[54] AMINOALKOXYPHENYLUREA DERIVATIVES

[75] Inventor: John Krapcho, Somerset, N.J.

[73] Assignee: E. R. Squibb & Sons Inc., Princeton, N.J.

[22] Filed: Jan. 25, 1972

[21] Appl. No.: 220,699

Related U.S. Application Data

[63] Continuation-in-part of Ser. No. 46,520, June 15, 1970, abandoned, which is a continuation-in-part of Ser. No. 760,072, Sept. 16, 1968, abandoned.

[52] U.S. Cl.. 260/501.12, 260/247.2 A, 260/268 R, 260/268 C, 260/293.76, 260/501.11, 260/501.17, 260/501.19, 260/553 A, 260/553 C, 424/248, 424/251, 424/267, 424/316, 424/317, 424/322
[51] Int. Cl............................................ C07c 127/16
[58] Field of Search....... 260/501.12, 501.1, 501.19, 260/553 A, 553, 501.17

[56] References Cited
UNITED STATES PATENTS

| | | | |
|---|---|---|---|
| 2,714,613 | 8/1955 | Huebner et al. | 260/552 R |
| 2,951,092 | 8/1960 | Sowinski et al. | 260/553 A |
| 3,145,209 | 8/1964 | Krapcho | 260/553 A X |
| 3,234,255 | 2/1966 | Hackmann et al. | 260/501.1 X |
| 3,253,037 | 5/1966 | Huebner | 260/501.1 X |
| 3,291,830 | 12/1966 | Huebner | 260/501.1 X |
| 3,326,663 | 6/1967 | Soloway et al. | 260/553 A X |
| 3,352,912 | 11/1967 | Prichard | 260/501.1 X |
| 3,534,100 | 10/1970 | Bollag et al. | 260/553 A X |

OTHER PUBLICATIONS

Krapcho et al., J. Med. Chem., Vol. 7, pp. 376–377, (May 1964).

Primary Examiner—Leon Zitver
Assistant Examiner—Michael W. Glynn
Attorney, Agent, or Firm—Lawrence S. Levinson; Merle J. Smith

[57] ABSTRACT

Disclosed herein are novel aminoalkoxyphenylurea derivatives having the general formula

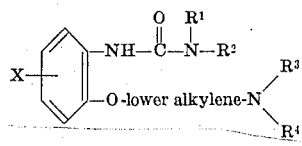

The compounds of this invention are useful as antiarrhythmic agents.

9 Claims, No Drawings

AMINOALKOXYPHENYLUREA DERIVATIVES

This application is a continuation-in-part of my application Ser. No. 46,520, filed June 15, 1970, now abandoned, which in turn is a continuation-in-part of my application Ser. No. 760,072, filed Sept. 16, 1968, now abandoned.

DETAILED DESCRIPTION OF THE INVENTION

This invention relates to bases having the formula I:

(I) 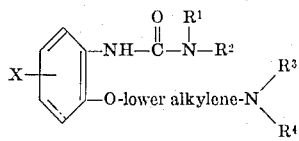

and to salts of said bases, wherein the X is hydrogen, halogen (e.g., chloro and bromo), trifluoromethyl, lower alkyl and lower alkoxy; $R^1$ and $R^2$ are the same or different and are hydrogen, lower alkyl, allyl cyclo-lower alkyl, phenyl or X-substituted phenyl or the

group is a 5- or 6-membered heterocyclic radical of the group consisting of piperidino, piperazino, lower alkyl piperazino, morpholino and pyrrolidino; $R^3$ and $R^4$ are the same as $R^1$ and $R^2$, respectively, and the group

represents the same heterocyclic radicals as the group

Among the suitable radicals represented by the group

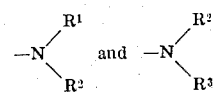

are amino; (lower alkyl)amino; di(lower alkyl)amino; allyl amino; (cyclo-lower alkyl)amino; and the heterocyclic radicals piperidino; pyrrolidino; morpholino; piperazino; 4-(lower alkyl)piperazino (e.g., $N^4$-ethylpiperazino; $N^4$-methylpiperazino, and so forth);

The terms "lower alkyl," "lower alkoxy," and "lower alkylene," as employed herein, include both straight and branched chain hydrocarbon radicals of less than eight carbon atoms, for example, methyl, ethyl propyl, isopropyl, butyl, isobutyl, t-butyl, amyl, methoxy, ethoxy, propoxy, isopropoxy, ethylene, propylene, and the like. The cyclo-lower alkyl groups are the 3 to 6 carbon alicyclics of which cyclohexyl is preferred.

The preferred compounds are those wherein X is hydrogen; the lower alkylene group is propyl; $R^1$ is hydrogen; $R^2$ is methyl or phenyl; and $R^3$ and $R^4$ each is methyl.

The compounds of this invention are therapeutically active substances which possess antiarrhythmic activity and can be formulated and utilized in a manner similar to Pronestyl. For example the bases of formula or pharmaceutically acceptable acid addition salts thereof are useful in the relief or suppression of ventricular arrhythmias in animal species when administered orally or parenterally in a dosage of about 5 to 40 mg/kg per day as demonstrated in infarction-induced arrhythmias in dogs and in thevetin-induced ventricular arrhythmias in dogs.

The base or its pharmaceutically acceptable acid addition salt may be administered in a dosage indicated above by incorporating the active substance in a pharmaceutically acceptable carrier therefor, e.g., in an oral dosage form such as a tablet or capsule along with conventional carrier, excipient, binder, lubricant or the like according to accepted pharmaceutical practice, or in a parenteral dosage form, such as for intravenous use including the salt in a sterile aqueous vehicle along with any necessary stabilizers, preservatives, buffers or the like. Up to about 500 mg. of salt per unit of dosage, e.g., per tablet or ml. of vehicle, preferably 250 to 500 mg. per dosage unit may be formulated.

Compounds of this invention, wherein

is $-NH_2$, can be prepared by reacting an amino compound of Formula II:

(II) 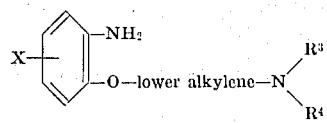

wherein X, $R^3$ and $R^4$ are as described above, with an alkali metal cyanate such as sodium cyanate or potassium cyanate.

Compounds having radicals of the formula

can be prepared by reacting a compound of Formula II with an isocyanate of formula $R^2CNO$.

Compounds having the radicals of the formula

can be readily prepared by reacting compounds of Formula II with a carbonyl chloride of Formula III:

(III) 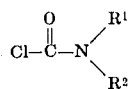

wherein $R^1$ and $R^2$ are as defined above to form a product of Formula I.

Alternatively, compounds of Formula I can be prepared by the interaction of phosgene with compounds of Formula II to yield compounds of Formula IV:

(IV) 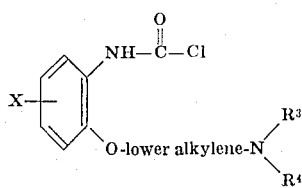

wherein X, $R^3$ and $R^4$ are as described above.

The chloro compounds prepared in this manner can thereafter be reacted with a desired amine of formula

wherein $R^1$ and $R^2$ are as defined above to yield the desired product of Formula I.

Examples of carbamyl chloride of the formula III suitable for utilization in the invention are N,N-dimethylcarbamyl chloride; N,N-dipropylcarbamyl chloride; N,N-dihexylcarbamyl chloride; N-methyl-N-propyl carbamyl chloride; morpholinyl carbamyl chloride; piperazinyl carbamyl chloride; pyrrolidyl carbamyl chloride, and so forth.

Amino compounds of Formula II are prepared by reacting a compound of the general Formula V:

(V) 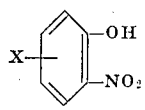

wherein X is as hereinbefore defined, with a compound of the formula:

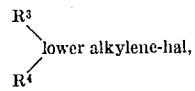

wherein $R^3$ and $R^4$ are as hereinbefore defined and hal is chlorine or bromine, the reaction being carried out in the presence of a strong base, such as sodamide, sodium methylate, sodium hydroxide, sodium hydride and potassium hydroxide, to yield intermediates of this invention of the general Formula VI:

(VI) 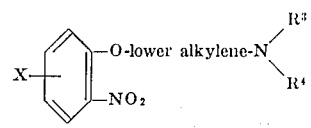

The nitro group is then reduced catalytically, as by treatment with hydrogen in the presence of a hydrogenation catalyst, such as 5 percent palladium-carbon, or chemically, as by treatment with stannous chloride or sodium hydrosulfite, to yield intermediates of this invention of the general Formula VII:

(VII) 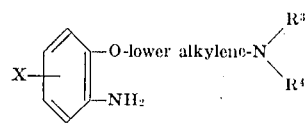

and the resulting amine is then reacted as detailed above.

The bases of Formula I form acid addition salts by reaction with the common inorganic and organic acids. Such inorganic salts as hydrohalides, e.g., hydrobromide, hydrochloride, hydroiodide, sulfates, nitrates, phosphates, borates, and so forth, and organic salts as acetate, oxalate, tartrate, maleate, fumarate, citrate, succinate, benzoate, ascorbate, salicylate, theophyllinate, camphorsulfonate, alkanesulfonate, e.g., methanesulfonate; arylsulfonate, e.g., benzenesulfonate, toluenesulfonate; cyclohexanesulfamate, p-toluenesulfonate, sulfamate, 2-naphthalenesulfonate, p-aminobenzoate, p-acetamidobenzoate, pamoate, and the like, are also within the scope of the invention. It is frequently convenient to effect the purification of the product by forming the acid salt. The base may be obtained therefrom by neutralization with an alkali hydroxide such as sodium hydroxide.

EXAMPLE 1

1-[2-(3-Dimethylaminopropoxy)phenyl]-3-methylurea, Hydrochloride

A solution of 12.8 g. of 2-(3-dimethylaminopropoxy)-aniline and 5.0 g. of methyl isocyanate in 195 ml. of benzene is refluxed for three hours and the solvent removed under reduced pressure. The residue is triturated under 100 ml. of hexane and filtered to give 15.5 g. of solid. The latter is crystallized from 350 ml. of isopropyl ether to give 11.6 g. of colorless base, m.p. 87°–89°. A solution of 11.5 g. of this material in 750 ml. of ether is treated with ethereal hydrogen chloride to give 12.4 g. of material, m.p. 158°–160°. After crystallization from 60 ml. of acetonitrile, the colorless product weighs 10.1 g. m.p. 159°–161°.

EXAMPLE 2

1-[2-(3-Dimethylaminopropoxy)-5-methoxyphenyl]-3-methylurea, Hydrochloride

Interaction of 15.0 g. of 2-(3-dimethylaminopropoxy)-5-methoxyaniline and 5.0 g. of methyl isocyanate in benzene according to the procedure of Example 1 gives 18.4 g. of base, m.p. 99°–103°. After crystallization from 50 ml. of acetonitrile, the product weighs 14.4 g., m.p., 107°–109°. A solution of this material in 50 ml. of chloroform is treated with 8 ml. of 8N alcoholic hydrogen chloride and diluted with ether until the solution becomes turbid. After standing overnight, the nearly colorless solid is filtered and dried; wt., 15.8 g., m.p. 175°–177°. After recrystallization from 175 ml. of acetonitrile, the product weighs 12.7 g., m.p. 176°–178°.

EXAMPLE 3

1-[2-(3-Dimethylaminopropoxy)-6-methylphenyl]-3-methylurea, Fumarate

Interaction of 17.0 g. of 2-(3-dimethylaminopropoxy)-6-methylaniline with 7.2 g. of methylisocyanate according to the procedure of Example 1 gives 20.7 g. of product, m.p., 135°–137°. After crystallization from 100 ml. of acetonitrile, the colorless base weighs 18.8 g., m.p. 137°–139°.

A solution of 8.0 g. of the above base and 3.6 g. of fumaric acid in 40 ml. of methanol is diluted with ether to give 10.0 g. of the salt, m.p., 135°–137°. After crystallization from 50 ml. of isopropanol, the colorless product weighs 8.7 g., m.p. 142°–144°.

EXAMPLE 4

1-[2-(3-Dimethylaminopropoxy)-5-methylphenyl]-3-methylurea, Hydrochloride

Interaction of 8.5 g. of 2-(3-dimethylaminopropoxy)-5-methylaniline with 3.5 g. of methylisocyanate according to Example 1 gives 8.7 g. of the base, m.p., 117°–119° (from 30 ml. benzene - 30 ml. of hexane). This base (8.6 g.) yields 7.4 g. of the purified hydrochloride salt, m.p. 176°–178° (from 80 ml. of acetonitrile).

EXAMPLE 5

1-[2-(3-Dimethylaminopropoxy)]phenyl urea

A solution of 17.0 g. of 2-(3-dimethylaminopropoxy)aniline in 20 ml. of acetic acid is diluted with 300 ml. of water and treated at 30° with a solution of 7.8 g. of 92 percent potassium cyanate in 30 ml. of water. After standing overnight at room temperature, the solution is basified with potassium carbonate and the liberated oil is extracted with ether-chloroform (3 × 200 ml.). The extracts are combined, dried over magnesium sulfate, filtered and the solvent removed under reduced pressure to give 18.3 g. of the base, m.p. 128°–131°. Recrystallization from 100 ml. of acetonitrile gives 14.5 g. of product, m.p. 135°–137°.

EXAMPLE 6

1-[2-(3-Dimethylaminopropoxy)phenyl]urea, Cyclohexanesulfamate

A solution of 14.4 g. of material from Example 5 in absolute alcohol is treated with 11 g. of cyclohexanesulfamic acid and the resulting solution is diluted to 200 ml. with ether to give 25 g. of solid, m.p. 140°–142°. Following crystallization from 250 ml. of acetonitrile, the colorless product weighs 22.9 g., m.p. 140°–142°.

EXAMPLE 7

1-[2-(3-Dimethylaminopropoxy)phenyl]-3-phenylurea

Interaction of 13.0 g. of 2-(3-dimethylaminopropoxy)-aniline with 8.0 g. of phenylisocyanate in 400 ml. of ether according to the procedure of Example 1 gives 18.5 g. of product, m.p. 123°–126°. After crystallization from 80 ml. of acetonitrile, the product weighs 14.5 g., m.p. 127°–129°.

EXAMPLE 8

1-[2-(3-Dimethylaminopropoxy)phenyl]-3-phenylurea, Cyclohexanesulfamate

A solution of 14.3 g. of material from Example 7 in 50 ml. of ethanol is treated with 8.3 g. of cyclohexanesulfamic acid and the resulting solution diluted to 200 ml. with ether to give 22.0 g. of product, m.p. 107°–110°. Crystallization from 100 ml. of acetonitrile gives 17.2 g. of colorless solid, m.p. 108°–110°.

EXAMPLE 9

3-[2-(3-Dimethylaminopropoxy)phenyl]-1,1-dimethylurea, Hydrochloride

A solution of 21.0 g. of 2-(3-dimethylaminopropoxy)aniline in 200 ml. of toluene is treated with a solution of 15.0 g. of dimethylcarbamyl chloride in 100 ml. of toluene. The resulting solution is refluxed for 8 hours and the solvent removed under reduced pressure to give the product.

EXAMPLE 10

1-[4-Chloro-2-(3-dimethylaminopropoxy)phenyl]-3-methylurea, Hydrochloride

Utilizing the procedure of Example 1 but substituting an equivalent quantity of 4-chloro-2-(3-dimethylaminopropoxy)aniline for the 2-(3-dimethylaminopropoxy)aniline, the product is obtained.

EXAMPLE 11

1-[2-(3-Dimethylaminopropoxy)-5-trifluoromethylphenyl]-3-methyl urea, Hydrochloride Utilizing the procedure of Example 1 but substituting an equivalent quantity of 2-(3-dimethylaminopropoxy)-5-trifluoromethylaniline for the 2-(3-dimethylaminopropoxy)aniline, the product is obtained.

EXAMPLE 12

2'[3-(Dimethylamino)propoxy]-1-pyrrolidinecarboxanilide, Hydrochloride

A solution of 21.0 g. of 2-(3-dimethylaminopropoxy)aniline in 200 ml. of chloroform is treated with 10.0 g. of phosgene in 50 ml. of toluene. The mixture is allowed to stir at room temperature for 4 hours and treated with 7.5 g. of pyrrolidine. The mixture is refluxed for 1 hour and the solvent removed under reduced pressure to give 2'-[3-(dimethylamino)propoxy]-1-pyrrolidinecarboxanilide hydrochloride.

EXAMPLE 13

2'-[3-(Dimethylamino)propoxy]-4-methyl-1-piperazinecarboxanilide, Hydrochloride

Using the procedure of Example 12 but substituting N-methylpiperazine for the pyrrolidine, there is obtained 2'-[3-(dimethylamino)propoxy]-4-methyl-1-piperazinecarboxanilide, hydrochloride.

EXAMPLE 14

1-[2-(3-Dimethylaminopropoxy)phenyl]-3-ethylurea, Hydrochloride

Using the procedure of Example 1 but substituting an equivalent quantity of ethyl isocyanate for the methyl isocyanate, 1-[2-(3-dimethylaminopropoxy)phenyl]-3-ethylurea, hydrochloride, is obtained.

EXAMPLE 15

1-[2-(2-Diethylaminoethoxy)phenyl]-3-propylurea

Using the procedure of Example 1 but substituting an equivalent quantity of 2-(2-diethylaminoethoxy)aniline for the 2-(3-dimethylaminopropoxy)aniline and substituting an equivalent quantity of propyl isocycanate for the methyl isocyanate, 1-[2-(2-diethylaminoethoxy)-phenyl]-3-propylurea, hydrochloride, is obtained.

EXAMPLE 16

1-[2-(3-Dimethylaminopropoxy)phenyl]-3-allylurea

Using the procedure of Example 1 but substituting allylisocyanate for the methylisocyanate, 1-[2-(3-dimethyl-aminopropoxy)phenyl]-3-allylurea is obtained.

EXAMPLE 17

1-[2-(3-Dimethylaminopropoxy)phenyl]-3-cyclohexylurea

Using the procedure of Example 1 but substituting cyclohexlisocyanate for the methyl isocyanate, 1-[2-(3-dimethylaminopropoxy)phenyl]-3-cyclohexylurea is obtained.

EXAMPLE 18

1-[2-(3-Dimethylaminopropoxy)phenyl]-3-(4-chlorophenyl)urea

Using the procedure of Example 1 but substituting 4-chlorophenyl isocyanate for the methyl isocyanate 1-[2-(3-dimethylaminopropoxy)phenyl]-3-(4-chlorophenyl)urea is obtained.

EXAMPLE 19

1-[2-(3-Dimethylaminopropoxy)phenyl]-3-methylurea, P-toluenesulfonate

By substituting p-toluenesulfonic acid for the hydrogen chloride in the procedure of Example 1, 1-[2-(3-dimethylaminopropoxy)phenyl]-3-methyl urea, p-toluenesulfonate is obtained.

EXAMPLE 20

1-[2-(3-Dimethylaminopropoxy)phenyl]-3-phenylurea, P-toluenesulfonate

By utilizing the product of Example 7 in the procedure of Example 6 but substituting p-toluenesulfonic acid for the cyclohexanesulfamic acid, 1-[2-(3-dimethylaminopropoxy)phenyl]-3-phenylurea, p-toluenesulfonate is obtained.

EXAMPLE 21

The following ingredients are used to prepare capsules:

| | |
|---|---|
| 1-[2-(3-diemthylaminopropoxy)-phenyl]-3-methylurea p-toluenesulfonate | 250 gm. |
| Lactose | 96.5 gm. |
| Magnesium stearate | 3.5 gm. |

All of the ingredients are thoroughly blended and filled into No. 2 gelatin capsules each containing 350 mg., each of which contains 250 mg. of active ingredient.

EXAMPLE 22

Gelatin capsules each containing 250 mg. of 1-[2-(3-dimethylaminopropoxy)phenyl]-3-methylurea hydrochloride are prepared in the same manner as in Example 21 by substituting 250 gm. of the hydrochloride for the p-toluenesulfonate in that example.

EXAMPLE 23

The following ingredients are used to make 1000 350 mg. tablets each containing 250 mg. of active ingredient:

| | |
|---|---|
| 1-[2-(3-dimethylaminopropoxy)-phenyl]-3-methylurea p-toluenesulfonate | 250 gm. |
| Polyvinyl pyrrolidone | 7.5 gm. |
| Lactose | 20 gm. |
| Magnesium stearate | 3.5 gm. |
| Corn starch | 17.5 gm. |
| Avicel (microcrystalline cellulose) | 51.5 gm. |

The toluenesulfonate and lactose are thoroughly admixed. The polyvinyl pyrrolidone is dissolved in ethanol U.S.P. to make a 30 percent solution. This solution is used to granulate the mixture of toluenesulfonate and lactose. The granulation is passed through a No. 16 screen and air dried. The dried granulation is then passed through a No. 20 screen. To the screened granulation are added the magnesium stearate, Avicel and corn starch and the mixture is blended. The blend is then compressed into 350 mg. tablets on a ⅜-inch round, standard concave punch. The tablets are then veneer coated with methyl cellulose in a spray pan.

EXAMPLE 24

250 gm. of 1-[2-(3-dimethylaminopropoxy)phenyl]-3-methyl-urea p-toluenesulfonate are aseptically recrystallized. The sterile salt is filled into 1000 sterile vials each containing 250 mg. of the salt and sealed with a rubber stopper. Prior to use intramuscularly or intravenously, the contents of the vial is reconstituted with 2 ml. of sterile water for injection.

EXAMPLE 25

Vials containing 250 mg. of 1-[2-(3-dimethylaminopropoxy)-phenyl]-3-methylurea cyclohexanesulfamate for reconstitution are prepared in the same manner as in Example 24.

What is claimed is:

1. A compound having the formula

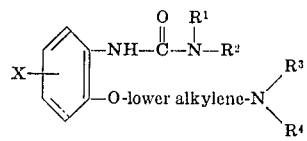

or a salt thereof with pharamaceutically acceptable acids, wherein the X is hydrogen, halogen, trifluoromethyl, lower alkyl or lower alkoxy; $R^1$ and $R^2$ and $R^3$ and $R^4$ are the same or different and each is hydrogen, lower alkyl, allyl, cyclo-lower alkyl, phenyl or X-phenyl.

2. A compound having the formula

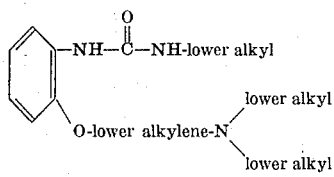

or a salt thereof with a pharmaceutically acceptable acid.

3. A compound having the formula

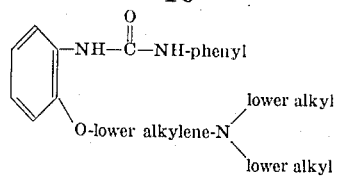

or a salt thereof with a pharmaceutically acceptable acid.

4. A compound as in claim 2 wherein the lower alkylene group has three carbons.

5. A compound as in claim 2 wherein the lower alkylene group has three carbons and each lower alkyl group is methyl or a salt, thereof with a pharmaceutically acceptable acid.

6. The cyclohexanesulfamic acid salt of the compound of claim 5.

7. The p-toluenesulfonic acid salt of the compound of claim 5.

8. A compound as in claim 3 wherein the lower alkylene group has three carbons.

9. A compound as in claim 3 wherein the lower alkylene group has three carbons and each lower alkyl group is methyl.

* * * * *